US011859441B2

(12) United States Patent
Meyer

(10) Patent No.: US 11,859,441 B2
(45) Date of Patent: Jan. 2, 2024

(54) FENESTRATION UNIT WITH DRAINAGE PASSAGE FROM CORNER KEY AND THROUGH CLADDING

(71) Applicant: JELD-WEN, Inc., Charlotte, NC (US)

(72) Inventor: Shane Michael Meyer, Klamath Falls, OR (US)

(73) Assignee: JELD-WEN, Inc.

( * ) Notice: Subject to any disclaimer, the term of this patent is extended or adjusted under 35 U.S.C. 154(b) by 64 days.

(21) Appl. No.: 17/452,603

(22) Filed: Oct. 28, 2021

(65) Prior Publication Data

US 2023/0134444 A1 May 4, 2023

(51) Int. Cl.

| | |
|---|---|
| ***E06B 7/14*** | (2006.01) |
| ***E06B 3/968*** | (2006.01) |
| ***E06B 3/964*** | (2006.01) |
| ***E06B 3/96*** | (2006.01) |
| ***E06B 3/94*** | (2006.01) |

(52) U.S. Cl.

CPC .................. *E06B 7/14* (2013.01); *E06B 3/94* (2013.01); *E06B 3/964* (2013.01); *E06B 3/9632* (2013.01); *E06B 3/9642* (2013.01); *E06B 3/9681* (2013.01)

(58) Field of Classification Search

CPC .......... E06B 3/94; E06B 3/9632; E06B 3/964; E06B 3/9642; E06B 3/9681; E06B 7/14

See application file for complete search history.

(56) References Cited

U.S. PATENT DOCUMENTS

| | | | | |
|---|---|---|---|---|
| 116,414 | A | 6/1871 | Cocheane | |
| 257,000 | A | 4/1882 | Cofban | |
| 281,894 | A | 7/1883 | Lockwood | |
| 866,000 | A | 9/1907 | Cumming | |
| 1,520,000 | A | 12/1924 | Robert et al. | |
| 4,300,000 | A | 11/1981 | Reinitz | |
| 4,553,361 | A | 11/1985 | Ralph | |
| 5,020,000 | A | 5/1991 | Carmichael | |
| 6,763,639 | B2 * | 7/2004 | Bennett | E06B 3/9632 49/504 |
| 6,848,225 | B2 | 2/2005 | Lapierre | |
| 8,353,138 | B2 | 1/2013 | Sigmund et al. | |
| 8,375,659 | B2 * | 2/2013 | Bogenhagen | E06B 1/70 49/470 |
| 10,844,654 | B1 | 11/2020 | Smith et al. | |
| 11,585,149 | B2 * | 2/2023 | Belau | E06B 3/9645 |
| 2002/0069589 | A1 * | 6/2002 | Bennett | E06B 3/9632 49/470 |
| 2005/0115178 | A1 * | 6/2005 | Schmidt | E06B 3/9641 52/272 |

(Continued)

FOREIGN PATENT DOCUMENTS

| | | | |
|---|---|---|---|
| CN | 209621140 | U | 11/2019 |
| CN | 209653779 | U | 11/2019 |

(Continued)

*Primary Examiner* — Jessie T Fonseca

(74) *Attorney, Agent, or Firm* — LKGlobal | Lorenz & Kopf, LLP

(57) ABSTRACT

A fenestration unit includes a frame corner key that includes a corner key fluid outlet and a cladding having an aperture for the corner key fluid outlet. The fenestration unit also includes a weep drainage system with a fluid path defined from the frame corner key, through the corner key fluid outlet, and through the aperture to drain from the fenestration unit.

19 Claims, 8 Drawing Sheets

(56) References Cited

U.S. PATENT DOCUMENTS

| | | | | |
|---|---|---|---|---|
| 2005/0223661 | A1 * | 10/2005 | Hetherington | E06B 3/9641 52/204.1 |
| 2008/0034702 | A1 * | 2/2008 | Garries | E06B 3/968 52/656.2 |
| 2010/0162644 | A1 | 7/2010 | Campbell et al. | |
| 2019/0352958 | A1 | 11/2019 | Albrecht | |
| 2020/0190896 | A1 * | 6/2020 | Kindt | E06B 7/14 |

FOREIGN PATENT DOCUMENTS

| | | | | |
|---|---|---|---|---|
| CN | 211397329 | U | 9/2020 | |
| CN | 211692192 | U | 10/2020 | |
| DE | 102019122297 | A1 | 2/2021 | |
| EP | 1221525 | A2 | 7/2002 | |
| EP | 3783186 | A1 | 2/2021 | |
| WO | WO-03058018 | A1 * | 7/2003 | E06B 3/9641 |
| WO | 2009086510 | A1 | 7/2009 | |

* cited by examiner

FENESTRATION UNIT WITH DRAINAGE PASSAGE FROM CORNER KEY AND THROUGH CLADDING

TECHNICAL FIELD

The present disclosure generally relates to a fenestration unit and, more particularly, relates to a fenestration unit with a drainage passage from a corner key and through cladding of the fenestration unit.

BACKGROUND

Fenestration units, such as windows and doors may include a moisture management system for managing rainwater, snow runoff, sleet, water from nearby sprinkler systems, and/or other moisture. These features may help divert, channel, and/or drain water away from the building interior and from the fenestration unit.

However, several challenges remain in this regard. For example, some of these features may not provide sufficient performance under some conditions. Also, these water management features may increase manufacturing costs by increasing part count, manufacturing time, etc. Furthermore, some water management features may be bulky or visually unappealing. In this regard, there may be mismatches in part color between the water management feature and the neighboring areas of the fenestration unit. Including water management systems without degrading the strength and robustness of the fenestration unit may be challenging as well.

Thus, it is desirable to provide an improved fenestration unit with one or more water management features, such as one or more interior drainage passages. It is also desirable to incorporate such features for high-efficiency and low-cost manufacture of the fenestration unit. Likewise, it is desirable to provide such features inconspicuously in a low-profile, compact, and visually appealing fenestration unit. It is further desirable to provide these features in a highly robust and weather-resistant fenestration unit. Other desirable features and characteristics of the present disclosure will become apparent from the subsequent detailed description and the appended claims, taken in conjunction with the accompanying drawings and this background discussion.

BRIEF SUMMARY

This is solved by the subject-matter of the independent claims. Further embodiments are included in the dependent claims.

In one embodiment, a fenestration unit is disclosed that includes a frame corner key that includes a corner key fluid outlet and a cladding having an aperture for the corner key fluid outlet. The fenestration unit also includes a weep drainage system with a fluid path defined from the frame corner key, through the corner key fluid outlet, and through the aperture to drain from the fenestration unit.

In another embodiment, a method of manufacturing a fenestration unit is disclosed that includes providing a frame corner key with a corner key fluid outlet. The method also includes attaching a cladding to the frame corner key. The cladding has an aperture for the corner key fluid outlet to define at least part of a weep drainage system with a fluid path defined from the frame corner key, through the corner key fluid outlet, and through the aperture to drain from the fenestration unit.

In an additional embodiment, a sliding window unit is disclosed that includes a sill member and a jamb member. The sliding window unit further includes a fenestration unit that includes a frame corner key having a corner key fluid outlet. The fenestration unit further includes a cladding having an aperture for the corner key fluid outlet. The fenestration unit also includes weep drainage system with a fluid path defined from the frame corner key, through the corner key fluid outlet, and through the aperture to drain from the fenestration unit. The frame corner key attaches the sill member and the jamb member, and the frame corner key includes a reservoir and a projection that defines the corner key fluid outlet. The cladding is provided as an apron cladding segment that is attached to and that covers over at least part of the sill member. The apron cladding segment has the aperture that receives the projection of the frame corner key. The apron cladding segment has a weep outlet. The weep drainage system with the fluid path is defined from the reservoir and to the weep outlet to drain from the fenestration unit.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a fenestration unit, such as a window unit, having a frame that includes a weep drainage system. The system may include an internal drainage path that is defined from a corner member of the frame to a weep outlet opening defined on the exterior of the fenestration unit.

In some embodiments, the system may include a corner component (e.g., a corner key) and cladding. The corner component may include a reservoir and a fluid outlet from the reservoir to define part of a fluid path. The cladding may also include at least one aperture that is coupled to the fluid outlet of the corner component, and the cladding may also include a weep outlet for the water to drain from the weep drainage system.

As will be discussed, the weep drainage system of the present disclosure provides effective moisture drainage. The weep drainage system may provide a low-profile, compact, and inconspicuous arrangement for moisture to drain from the fenestration unit. The fenestration unit may also be structurally robust. Furthermore, one or more features of the present disclosure may provide manufacturing benefits, such as lower part count, increased manufacturing efficiency, and/or other advantages.

Figure 1:
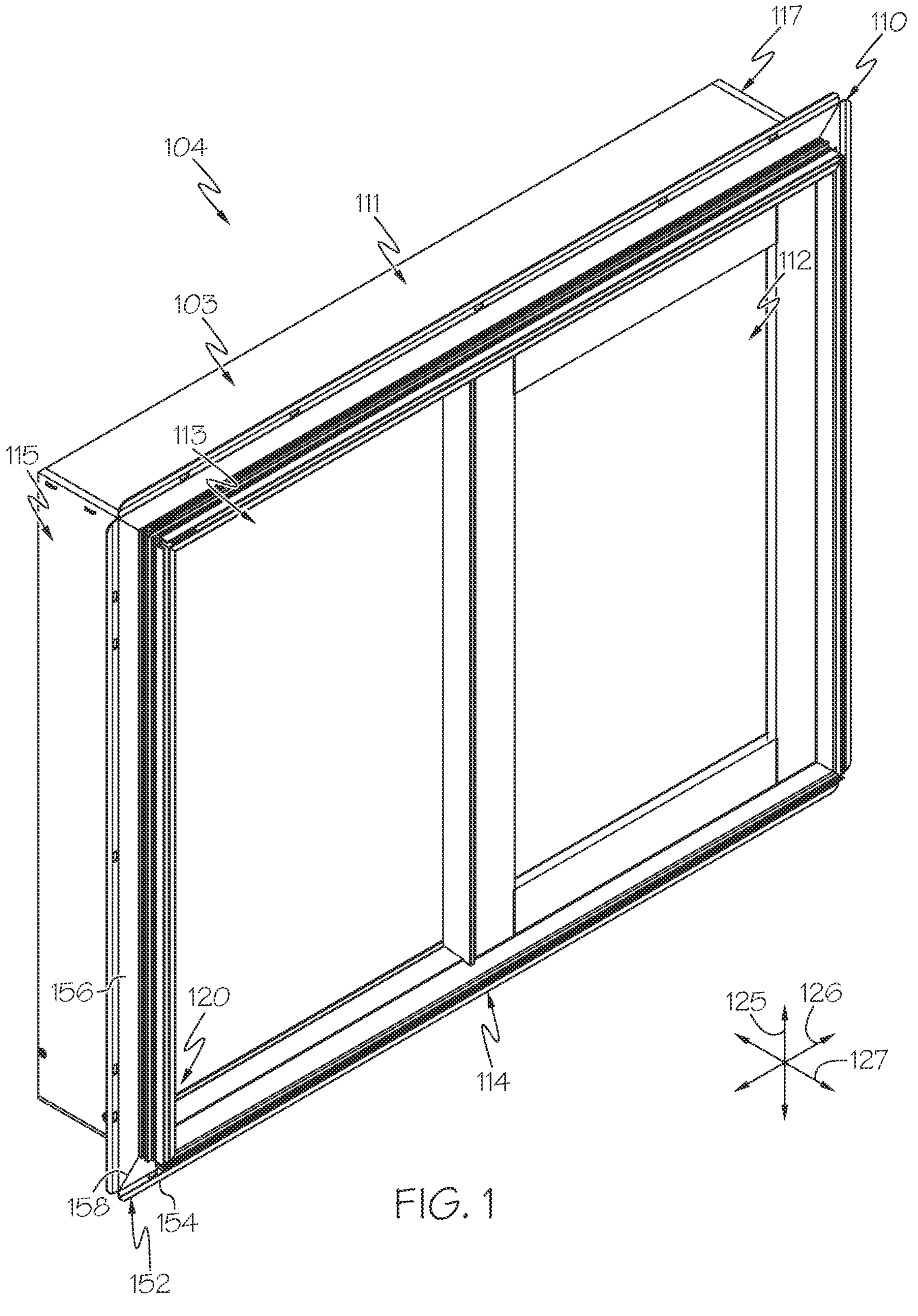
FIG. 1 is an exterior perspective view of a fenestration unit with a weep drainage system according to example embodiments of the present disclosure.

Referring now to FIG. 1, a fenestration unit 104 is shown according to example embodiments of the present disclosure. The fenestration unit 104 may include features that direct water, droplets of water, rainwater, sleet and snow runoff, water from sprinkler systems, and/or other moisture away and outward from the unit 104.

In some embodiments, the fenestration unit 104 may be configured as and/or combined with a horizontally sliding window unit 103, and the majority of the discussion will refer to the fenestration unit 104 as such. However, it will be appreciated that one or more features of the present disclosure may be configured for a horizontally sliding door or another type of fenestration unit 104 without departing from the scope of the present disclosure. Also, in some embodiments, the fenestration unit 104 may be a clad window as will be discussed in detail below; however, the fenestration unit 104 may have a different configuration without departing from the scope of the present disclosure.

As shown in FIG. 1, the fenestration unit 104 may include a frame 110 that supports a first panel 112 and a second panel 113. At least one of the panels 112, 113 may be a sliding panel that is supported within the frame 110 for sliding movement along a lateral axis 126 (i.e., lateral direction). In some embodiments, the first panel 112 may be a fixed, non-active panel that is fixedly supported within the frame 110, whereas the second panel 113 may be a horizontally sliding panel that is supported for sliding movement along the axis 126. (A vertical axis 125 and an interior/exterior axis 127 are also indicated in FIG. 1 for reference purposes.) The panels 112, 113 may be supported within the frame 110 and may be offset along the interior/exterior axis 127 such that the second panel 113 may slide and overlap the first panel 112 as the second panel 113 opens. The second panel 113 may also move to a closed position, as shown, in which the panels 112, 113 are non-overlapping and are spaced apart along the lateral axis 126.

As shown in FIG. 1, the frame 110 may be rectangular and may generally include a header 111, a first jamb 115, a second jamb 117, and a sill 114. The header 111 and sill 114 may extend along the lateral axis 126 and may be separated along the vertical axis 125. The first and second jambs 115, 117 may extend along the vertical axis 125 and may be separated along the lateral axis 126.

Figure 2:
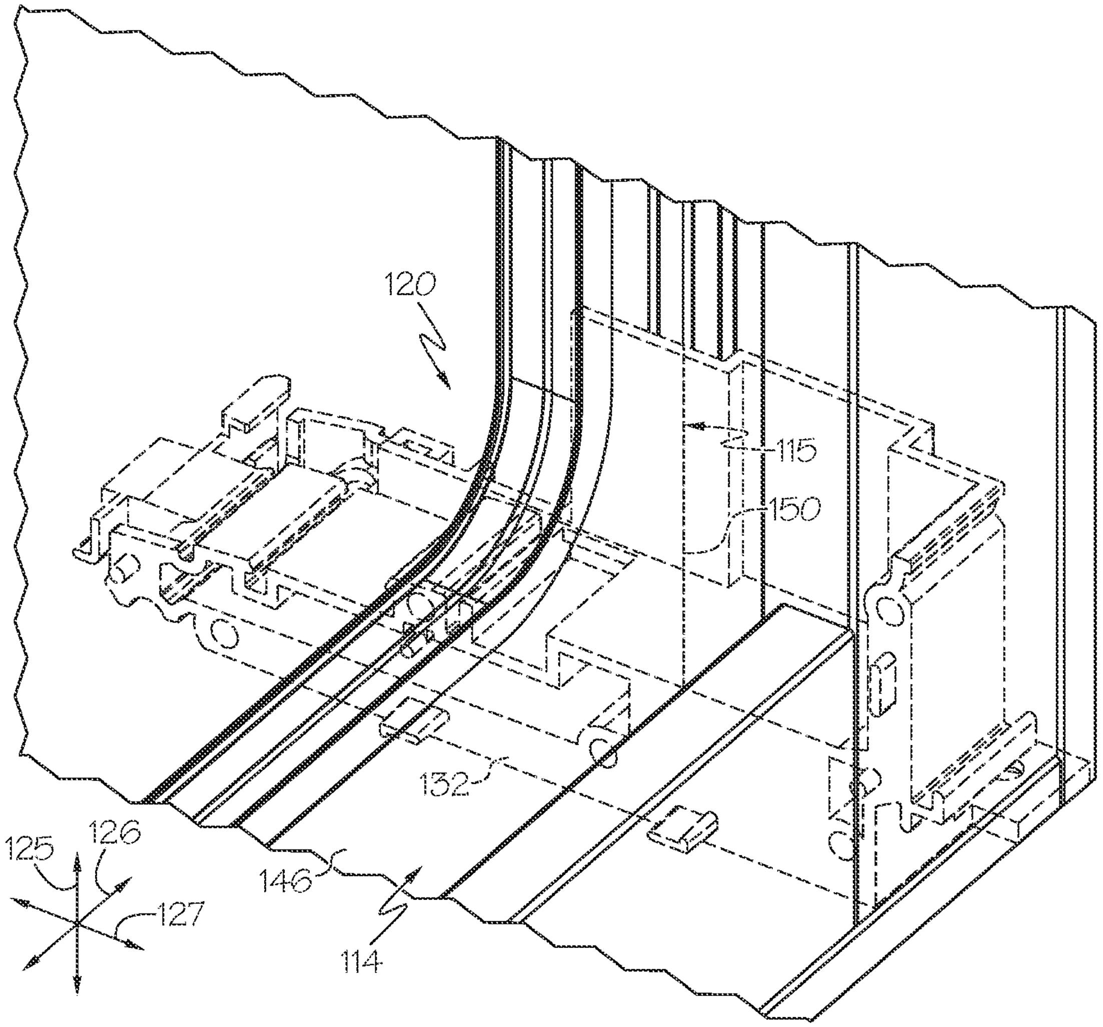
FIG. 2 is an interior perspective view of a corner joint of the fenestration unit of FIG. 1 showing features of the weep drainage system according to example embodiments.
Figure 3:
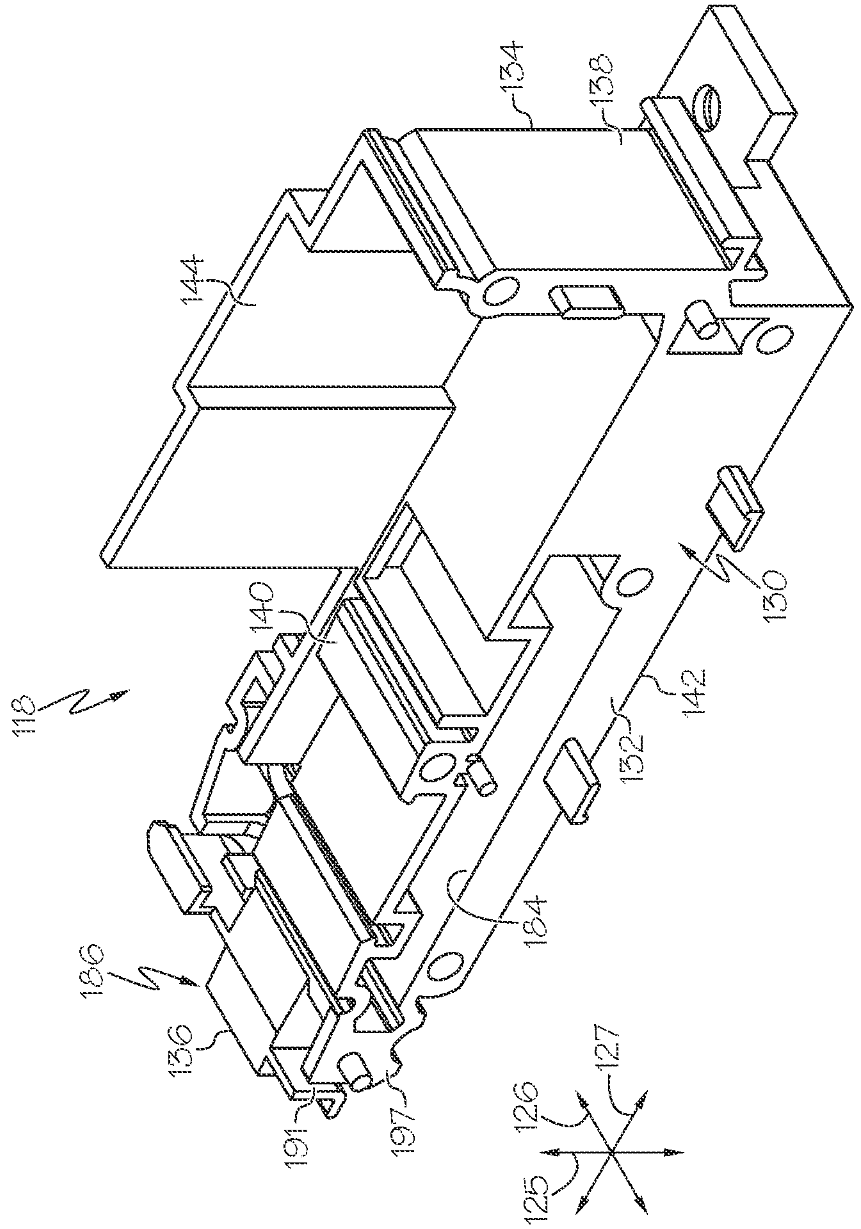
FIG. 3 is an interior perspective view of a corner key of the fenestration unit of FIG. 1.

As shown in FIG. 2, at least part of the vertically-extending first jamb 115 and at least part of the horizontally-extending sill 114 may be joined at a corner joint 120. It will be appreciated that the second jamb 117 may be joined to the opposite end of the sill 114 with a corner joint similar to the corner joint 120 described herein.

The corner joint 120 may include a corner key 118, such as the corner key 118 shown in FIGS. 2-5 according to example embodiments. The corner key 118 may include a substantially block-shaped base 130 (FIGS. 3 and 4), which includes a first lateral face 132, a second lateral face 134, an exterior end 136, an interior end 138, a top side 140, and a bottom side 142. The corner key 118 may also include one or more flanges 144 that extend vertically from the margin of the top side 140. The corner key 118 may also include a number of features (e.g., projections, pockets, bolt holes, fastener seats, etc.) for attaching to adjacent members of the frame 110. The corner key 118 may further include features that increase stiffness, strength, and robustness of the corner key 118. The corner key 118 may also include one or more features for collecting moisture and directing it away from the fenestration unit 104 as will be discussed.

In some embodiments, the corner key 118 may be formed of a polymeric material. In some embodiments, the corner key 118 may be an injection molded part. However, the corner key 118 may be made from different material and/or may be formed in other ways without departing from the scope of the present disclosure.

Figure 6:
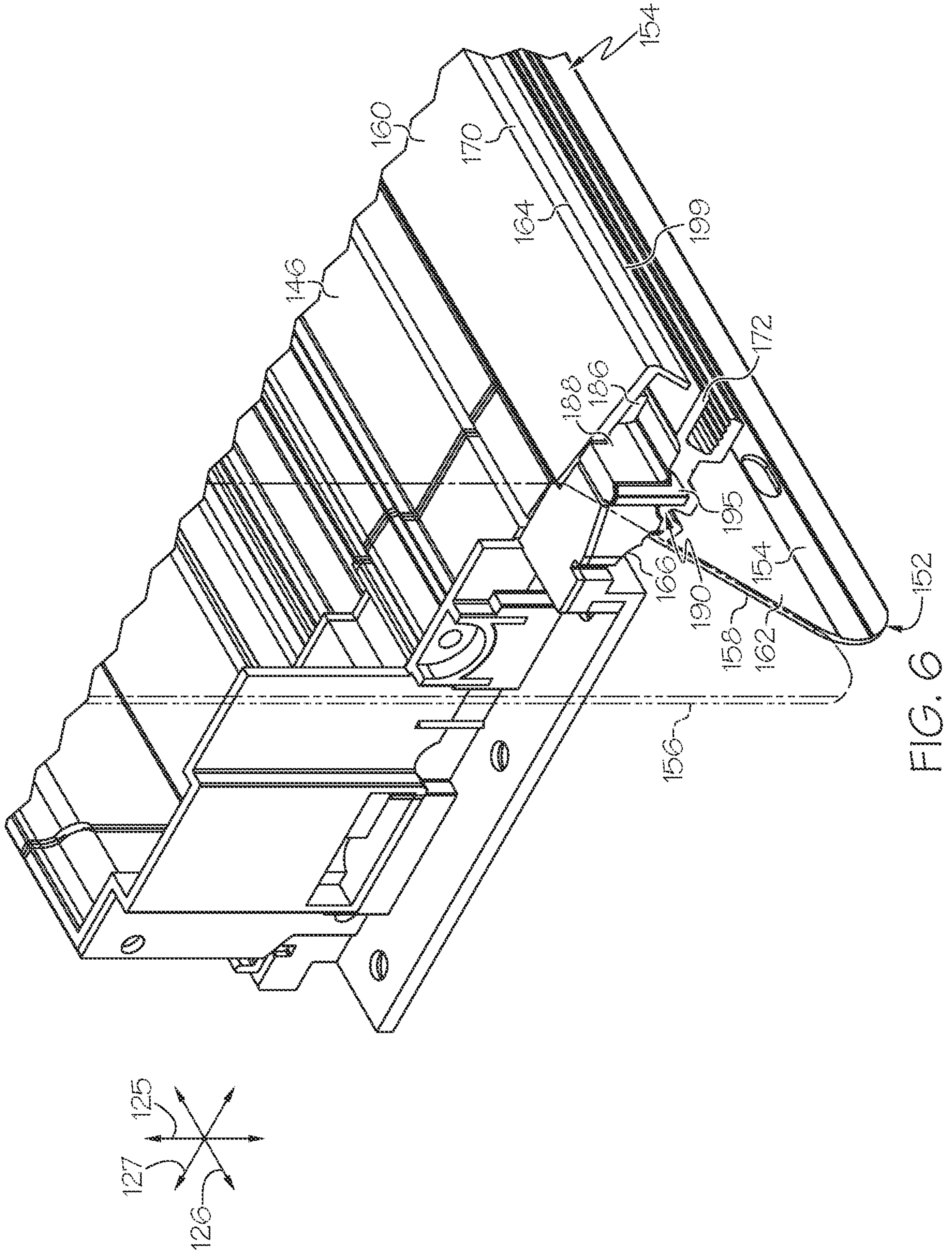
FIG. 6 is an exterior perspective view of the corner key and cladding of the fenestration unit of FIG. 1.

As shown in FIGS. 2 and 6, the first lateral face 132 of the corner key 118 may abut against and fixedly attach to a longitudinal end of a sill member 146 of the sill 114. The sill member 146 may be an elongate member that extends horizontally and linearly along the lateral axis 126. The sill member 146 may, in some embodiments, be a lineal extruded member of the sill 114. The sill member 146 may be constructed from and/or include vinyl, fiberglass, aluminum, and/or other material. The sill member 146 may be strong and stiff and may include a number of relatively thin walls that run along the lateral axis 126 and that match at least part of the profile of the first lateral face 132 of the corner key 118. Accordingly, at least some of the gaps, spaces, etc. in the lateral face 132 (e.g., those shown in FIG. 2) may be open to and may be continuous with corresponding gaps, spaces, etc. extending along the sill member 146 along the lateral axis 126. In some embodiments, the sill member 146 may be fixedly attached to the corner key 118 via fasteners, adhesives, and/or other attachments.

Moreover, as represented in FIG. 2, the top side 140 of the corner key 118 may abut against and fixedly attach to a longitudinal end of a jamb member 150 (shown in phantom). The jamb member 150 may be an elongate member that extends vertically and linearly along the vertical axis 125. The jamb member 150 may, in some embodiments, be a lineal extruded member of the jamb 115. The jamb member 150 may be constructed from and/or include vinyl, fiberglass, aluminum, and/or other material. In some embodiments, the jamb member 150 may be fixedly attached to the corner key 118 via fasteners, adhesives, and/or other attachments.

As stated, the fenestration unit 104 may be configured as a clad window (i.e., cladded window, wood-clad window, etc.). As such, the fenestration unit 104 may additionally include a cladding 152 as shown in FIGS. 1 and 6. The cladding 152 may include one or more plate- or strip-like segments that extend about and frame the exterior of the fenestration unit 104. The cladding 152 may be made of a strong material, such as metal in some embodiments. The cladding 152 may be made of aluminum alloy in some embodiments. The cladding 152 may be a lineal extruded part in some embodiments.

The cladding 152 may include a first cladding segment, referred to herein as an apron segment 154, and a second cladding segment, referred to herein as a jamb segment 156. The jamb segment 156 may extend vertically along the vertical axis 125 and may cover over the jamb member 150 and part of the corner key 118. The apron segment 154 may extend horizontally along the lateral axis 126 and may cover over the sill member 146 and part of the corner key 118. The apron segment 154 and jamb segment 156 may, in some embodiments, include respective terminal ends that are cut on a bias angle relative to the respective longitudinal axis. As shown in FIG. 1, these terminal ends may abut to cooperatively define a seam 158 in the cladding 152.

Figure 7:
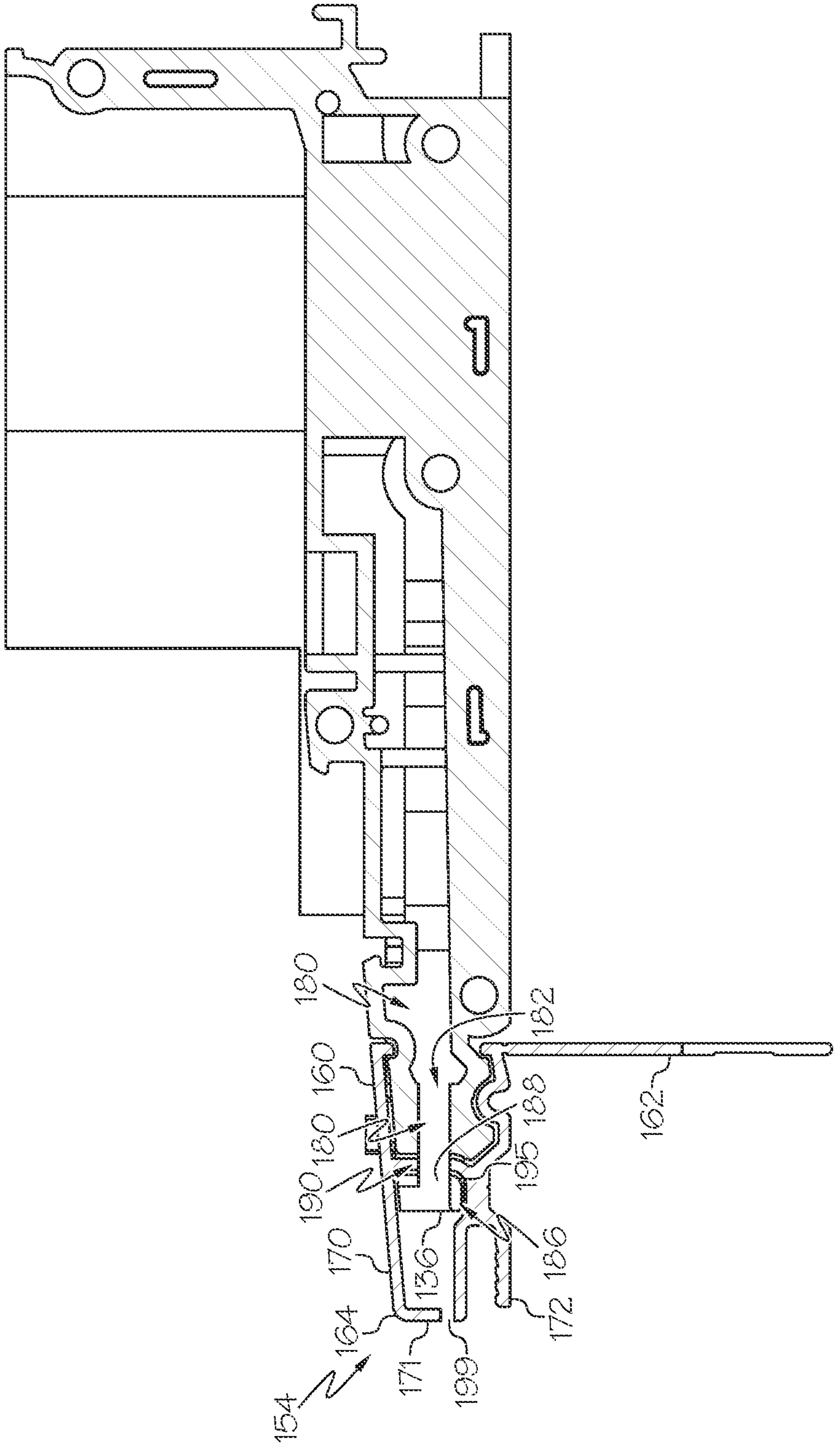
FIG. 7 is a section view of the corner key and cladding of the fenestration unit of FIG. 1.
Figure 8:
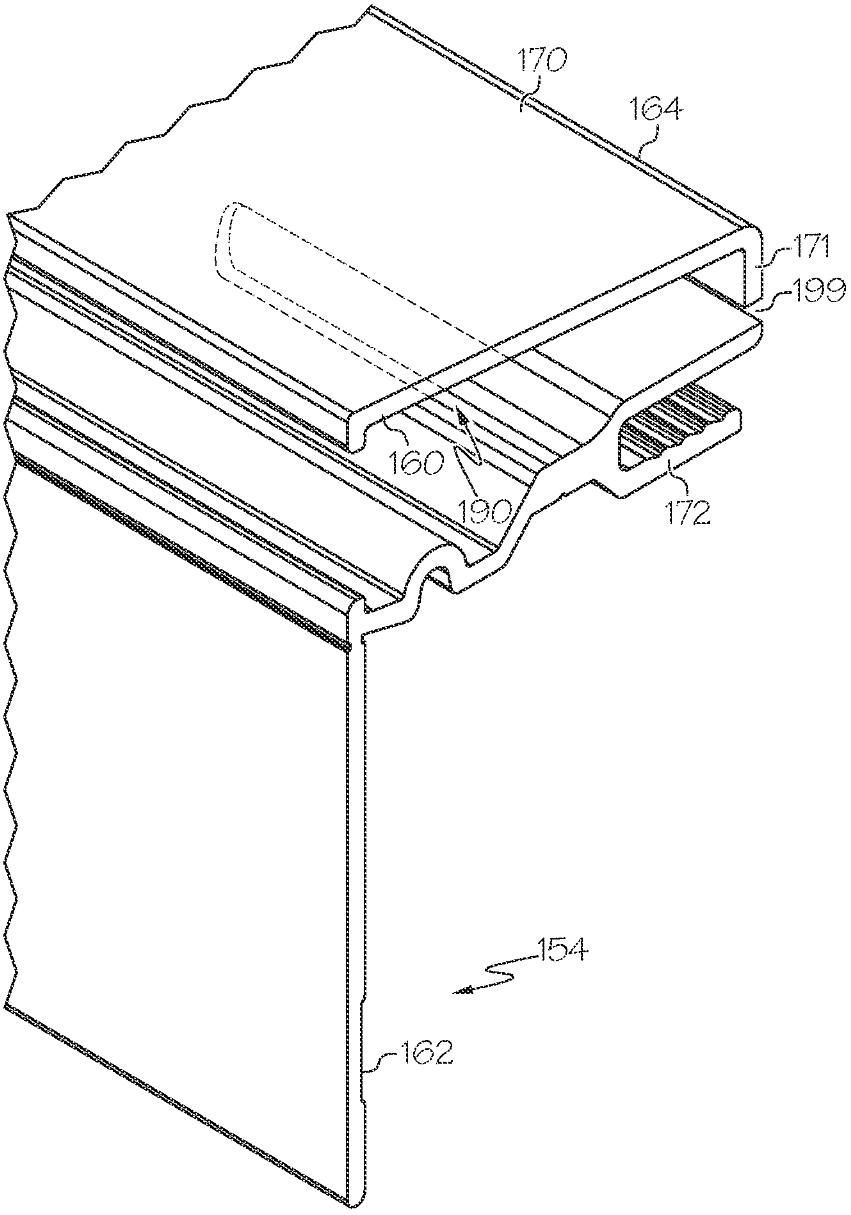
FIG. 8 is an interior perspective view of the cladding of the fenestration unit of FIG. 1.

FIGS. 6-8 represent the apron segment 154 according to example embodiments. The apron segment 154 may be a unitary, one-piece member. The apron segment 154 may be a lineal extruded part. The apron segment 154 may include a sill cover portion 160, an apron plate portion 162 that depends from the sill cover portion 160 along the vertical axis 125, and a projecting portion 164 that projects outward along the interior/exterior axis 127 from the sill cover portion 160. The sill cover portion 160 may include a generally C-shaped cross section as shown in FIG. 7 and may receive and cover the exterior end 136 of the corner key 118. The sill member 146 may continue the profile of the exterior end 136 further along the lateral axis 126 and the sill cover portion 160 may cover over and clad this portion of the sill member 146 as well. The apron plate portion 162 may extend downward vertically to cover over the portion of the wall below the fenestration unit 104.

The projecting portion 164 may include a first projecting wall 170 and a second projecting wall 172 that project outward from the sill cover portion 160. Both the first and second projecting walls 170, 172 may have relatively small wall thicknesses. The first projecting wall 170 may be flush and continuous with the top surface of the sill cover portion 160, and an exterior terminal edge of the first projecting wall 170 may be bent downward. The second projecting wall 172 may be spaced apart downwardly from the first projecting wall 170 along the vertical axis 125. The second projecting wall 172 may split into multiple (e.g., two) branches as it projects further from the cover portion 160.

The fenestration unit 104 further includes a weep drainage system 180 (FIG. 7). Generally, the weep drainage system 180 may define a fluid path 182 defined from the frame corner key 118 and through the cladding 152 to drain away from the fenestration unit 104 under force of gravity.

The corner key 118 may define features of the weep drainage system 180. In some embodiments, the corner key 118 may include at least one reservoir 184 of the drainage system 180. The reservoir may be recessed into the lateral face 132 along the lateral axis 126. Also, the reservoir 184 may extend along the interior/exterior axis 127. The reservoir 184 may be configured to receive and collect fluid (e.g., rainwater, snow runoff, etc.). For example, moisture in the jamb 115 may move into and collect in the reservoir 184. Also, moisture in the sill member 146 and/or other portions of the sill 114 may move into and collect in the reservoir 184. In some embodiments, the reservoir 184 may be tilted slightly toward the exterior such that the moisture moves toward the exterior end 136 of the corner key 118 under force of gravity.

The corner key 118 may further include a projection 186 that defines a corner key fluid outlet 188 of the weep drainage system 180. The projection 186 may project outward along the interior/exterior axis 127. The projection 186 may be a rectangular, hollow, and tubular. The corner key fluid outlet 188 may extend along the projection 186 through the projection 186. The corner key fluid outlet 188 may be fluidly connected to the reservoir 184. Accordingly, fluid in the reservoir 184 may flow to the corner key fluid outlet 188 and outward from the corner key 118.

The cladding 152 may also define features of the weep drainage system 180. In some embodiments, the cladding 152 may include at least one aperture 190 (FIGS. 6-8) for the corner key fluid outlet 188. The aperture 190 may be a notch, slot, or other opening on one end of the apron segment 154 (FIG. 8) and may be formed in the sill cover portion 160. The aperture 190 may correspond in shape to the projection 186 of the corner key 118. The aperture 190 may receive the projection 186. In some embodiments, the apron segment 154 may fit within a gap 191 (FIG. 5) defined between the projection 186 and an adjacent flange 197 of the corner key 118. The jamb segment 156 of the cladding 152 may also abut against the apron segment 154 and close off the open end of the aperture 190 in the apron segment 154.

The cladding 152 may further include a weep outlet 199. The weep outlet 199 may be a slot that extends along the lateral axis 126 and may be defined between the first projecting wall 170 and the second projecting wall 172. Accordingly, the corner key fluid outlet 188 may be received in the aperture 190 of the cladding 152 and may be disposed and substantially hidden between the first and second projecting walls 170, 172 of the apron segment 154 of the cladding 152.

The weep drainage system 180 may also include a sealing member 195 (FIGS. 6 and 7). The sealing member 195 may be a cured sealant. The sealing member 195 may be a thin layer of sealant disposed between the cladding 152 and the projection 186 of the corner key, within the gap 191, and proximate the aperture 190. In some embodiments, the projection 186 may include a barrier wall 185 that projects laterally therefrom, and the barrier wall 185 may be shaped to direct uncured sealant as it flows around the aperture 190 to form the sealing member 195. Accordingly, the sealing member 195 may fluidly seal this area and ensure moisture flows out of the fenestration unit 104 as discussed.

Figure 4:
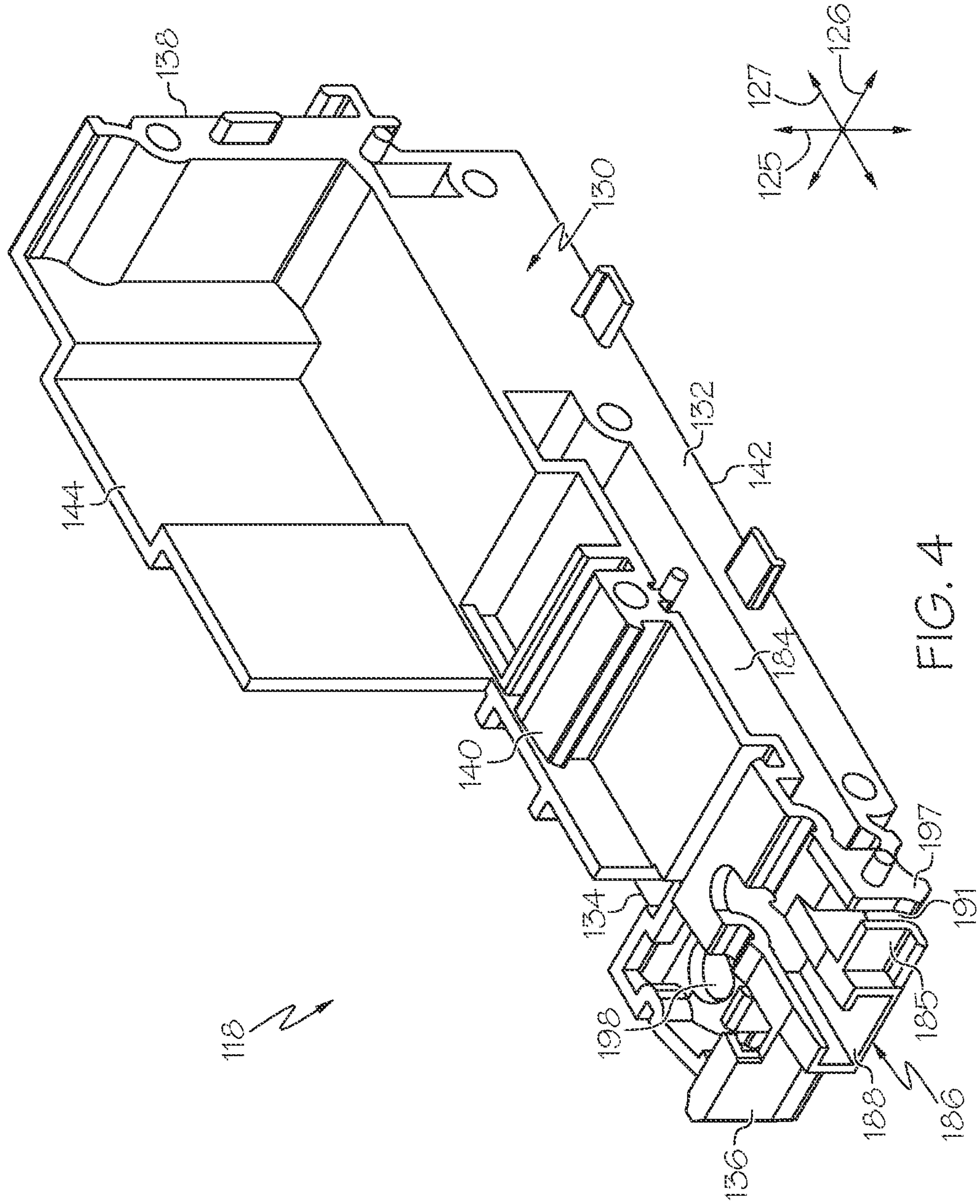
FIG. 4 is an exterior perspective view of the corner key of FIG. 3 from a first side.
Figure 5:
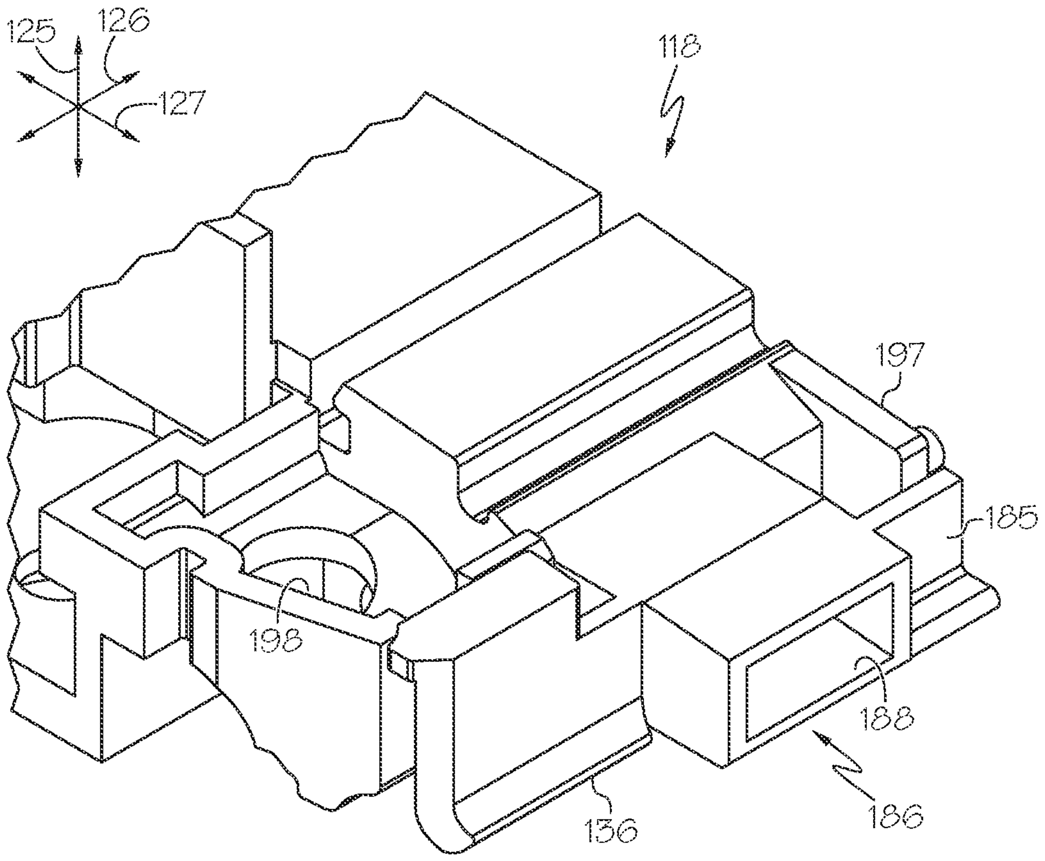
FIG. 5 is an exterior perspective view of the corner key of FIG. 5 from a second side.

The fenestration unit 104 may further include a sealing injection aperture 198. As shown in FIGS. 4 and 5, the corner key 118 may include the sealing injection aperture 198, which may be a through-hole at the bottom side 142. When assembled, the aperture 198 may provide access to the gap 191 from the exterior of the unit 104. Fluid sealant may be injected into the aperture 198, and the barrier wall 185 and other surrounding surfaces may direct the sealant so that it flows into the gap 191 and around the aperture 190. Then, the sealant may be cured to form the sealing member 195.

In some embodiments, to manufacture the fenestration unit 104, the segments of the cladding 152 may be extruded. The sill member 146 and the jamb member 150 may be extruded as well. The ends of these extruded members may be mitered as needed. The corner key 118 may be formed via injection molding in some embodiments. Furthermore, the aperture 190 may be formed in the apron segment 154 of the cladding 152, for example, by cutting material away, by punching through the material, or otherwise. For assembly, the apron segment 154 of the cladding 152 may be attached to the sill member 146, for example, by sliding along the lateral axis 126, by snap-on fitting, using fasteners, or otherwise. Then, the corner key 118 may be attached to the sill member 146 using fasteners, adhesives, and/or other attachments. When attaching the corner key 118, the projection 186 may be fitted within the aperture 190. Next, the jamb member 150 may be attached to the corner key 118 using fasteners, adhesives, and/or other attachments. Also, the jamb segment 156 of the cladding 152 may be attached to the jamb member 150 (by snap-on fit, slide-on fit, and/or other attachments). Subsequently, sealant may be injected into the aperture 198, and the injected sealant may be cured to form the sealing member 195. These manufacturing methods may be highly efficient, with relatively low part count, low costs, etc.

During use of the fenestration unit 104, fluid may move into and briefly collect within the reservoir 184. This moisture may flow along the fluid path 182 from the reservoir 184 of the frame corner key, through the corner key fluid outlet 188, through the aperture 190, and into the weep outlet 199 to drain from the fenestration unit. This weep drainage system 180 may be highly effective for removing moisture from the fenestration unit 104. The drainage system 180 may be very inconspicuous as well, even in a low-profile fenestration unit 104 of the type illustrated. Indeed, the system 180 is largely hidden inside the fenestration unit 104. Also, the weep outlet 199 is a small, inconspicuous opening that is integral to the cladding 152.

Furthermore, the following examples are provided:

In an example, a fenestration unit is disclosed that includes a frame corner key that includes a corner key fluid outlet. The fenestration unit also includes a cladding having an aperture for the corner key fluid outlet. Furthermore, the fenestration unit includes a weep drainage system with a fluid path defined from the frame corner key, through the corner key fluid outlet, and through the aperture to drain from the fenestration unit.

In an option, the frame corner key includes a projection, and the aperture receives the projection. The corner key fluid outlet extends along the projection.

In an additional option, the projection is hollow and tubular with the corner key fluid outlet extending therethrough.

In an additional option, the fenestration unit further includes a sealing member that seals between the frame corner key and the cladding, proximate the aperture.

In an additional option, the frame corner key includes a projection, and the aperture receives the projection. The corner key fluid outlet extends along the projection. The sealing member extends within a gap between the projection and the cladding, proximate the aperture.

Moreover, in an additional option, the corner key includes a sealant injection aperture that provides fluid access to the gap from outside the fenestration unit.

In an addition option, the corner key includes a reservoir configured to collect fluid. The fluid path is defined from the reservoir, through the corner key fluid outlet, and through the aperture to drain from the fenestration unit.

Furthermore, in an additional option, the cladding includes an apron segment with the aperture, the aperture being open at one end of the apron cladding segment.

In an additional option, the cladding includes an apron segment that defines at least part of the aperture and that includes a weep outlet. The fluid path is defined from the frame corner key, through the corner key fluid outlet, through the aperture, and through the weep outlet to drain from the fenestration unit.

Also, in an additional option, the fenestration unit includes a frame sill member. The apron segment includes a cover portion that at least partly covers the frame sill member and the frame corner key. The apron segment includes a first projecting wall and a second projecting wall that project from the cover portion. The aperture is included in the cover portion, and the weep outlet is defined between the first and second projecting walls.

In an additional example, a method of manufacturing a fenestration unit is disclosed. The method includes providing a frame corner key with a corner key fluid outlet. The method also includes attaching a cladding to the frame corner key. The cladding has an aperture for the corner key fluid outlet to define at least part of a weep drainage system with a fluid path defined from the frame corner key, through the corner key fluid outlet, and through the aperture to drain from the fenestration unit.

In an option, the method includes receiving a projection of the frame corner key within the aperture. The corner key fluid outlet extends along the projection.

In an additional option, the projection is hollow and tubular with the corner key fluid outlet extending therethrough.

In an additional option, the method further includes providing a sealing member that seals between the frame corner key and the cladding, proximate the aperture.

In an additional option, the frame corner key includes a projection. The corner key fluid outlet extends along the projection. The method further includes receiving the projection within the aperture. The method also includes extending the sealing member within a gap between the projection and the cladding, proximate the aperture.

In an additional option, the method further includes injecting sealant into the gap via a corner key sealant injection aperture providing fluid access to the gap from outside the fenestration unit. The method also includes curing the sealant after injecting the sealant.

In an additional option, the method includes providing the corner key with a reservoir configured to collect fluid. The fluid path is defined from the reservoir, through the corner key fluid outlet, and through the aperture to drain from the fenestration unit.

In an additional option, the cladding includes an apron segment that defines at least part of the aperture and that includes a weep outlet. The fluid path is defined from the frame corner key, through the corner key fluid outlet, through the aperture, and through the weep outlet to drain from the fenestration unit.

In an additional option, the method further includes providing a frame sill member. The apron segment includes a cover portion. The method further includes at least partly covering the frame sill member and the frame corner key with the cover portion. The apron segment includes a first projecting wall and a second projecting wall that project from the cover portion. The aperture is included in the cover portion, and the weep outlet is defined between the first and second projecting walls.

In a further example, a sliding window unit is disclosed that includes a sill member, a jamb member, and a fenestration unit comprising a frame corner key that includes a corner key fluid outlet, a cladding having an aperture for the corner key fluid outlet, and a weep drainage system with a fluid path defined from the frame corner key, through the corner key fluid outlet, and through the aperture to drain from the fenestration unit. The frame corner key attaches the sill member and the jamb member, the frame corner key including a reservoir and a projection that defines the corner key fluid outlet. The cladding is provided as an apron cladding segment that is attached to and that covers over at least part of the sill member, the apron cladding segment having the aperture that receives the projection of the frame corner key, the apron cladding segment having a weep outlet. The weep drainage system with the fluid path is defined from the reservoir and to the weep outlet to drain from the fenestration unit.

In an example, the sliding window unit is provided in combination with any of the above mentioned examples and options of the fenestration unit.

For example, the sliding window unit is combined with the fenestration unit.

For example, the sliding window unit is combined with the fenestration unit wherein the frame corner key includes a projection, and the aperture receives the projection, the corner key fluid outlet extending along the projection.

For example, the sliding window unit is combined with the fenestration unit wherein the projection is hollow and tubular with the corner key fluid outlet extending therethrough.

For example, the sliding window unit is combined with the fenestration unit further comprising a sealing member that seals between the frame corner key and the cladding, proximate the aperture.

For example, the sliding window unit is combined with the fenestration unit wherein the frame corner key includes a projection and the aperture receives the projection, the corner key fluid outlet extending along the projection. The sealing member extends within a gap between the projection and the cladding, proximate the aperture.

For example, the sliding window unit is combined with the fenestration unit wherein the corner key includes a sealant injection aperture that provides fluid access to the gap from outside the fenestration unit.

For example, the sliding window unit is combined with the fenestration unit wherein the corner key includes a reservoir configured to collect fluid, and wherein the fluid path is defined from the reservoir, through the corner key fluid outlet, and through the aperture to drain from the fenestration unit.

For example, the sliding window unit is combined with the fenestration unit wherein the cladding includes an apron segment with the aperture, the aperture being open at one end of the apron cladding segment.

For example, the sliding window unit is combined with the fenestration unit wherein the cladding includes an apron segment that defines at least part of the aperture and that includes a weep outlet; and the fluid path is defined from the frame corner key, through the corner key fluid outlet, through the aperture, and through the weep outlet to drain from the fenestration unit.

For example, the sliding window unit is combined with the fenestration unit further comprising a frame sill member; wherein the apron segment includes a cover portion that at least partly covers the frame sill member and the frame corner key; the apron segment includes a first projecting wall and a second projecting wall that project from the cover portion; and the aperture is included in the cover portion, and the weep outlet is defined between the first and second projecting walls.

In a further example, a sliding window unit is disclosed that includes a sill member, a jamb member, and a frame corner key that attaches the sill member and the jamb member. The frame corner key includes a reservoir and a projection that defines a corner key fluid outlet. The sliding window unit includes an apron cladding segment that is attached to and that covers over at least part of the sill member. The apron cladding segment has an aperture that receives the projection of the frame corner key. The apron cladding segment has a weep outlet. The window unit also includes a weep drainage system with a fluid path defined from reservoir, through the corner key fluid outlet, through the aperture, and to the weep outlet to drain from the fenestration unit.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

I claim:

1. A fenestration unit comprising:

a frame corner key that includes a corner key fluid outlet, the frame corner key including a projection that is hollow and tubular, the corner key fluid outlet extending along the projection and extending therethrough;

a cladding having an aperture for the corner key fluid outlet, the aperture receiving the projection; and a weep drainage system with a fluid path defined from the frame corner key, through the corner key fluid outlet, and through the aperture to drain from the fenestration unit.

2. The fenestration unit of claim 1, further comprising a sealing member that seals between the frame corner key and the cladding, proximate the aperture.

3. The fenestration unit of claim 2, wherein the frame corner key includes a projection and the aperture receives the projection, the corner key fluid outlet extending along the projection; and wherein the sealing member extends within a gap between the projection and the cladding, proximate the aperture.

4. The fenestration unit of claim 3, wherein the corner key includes a sealant injection aperture that provides fluid access to the gap from outside the fenestration unit.

5. The fenestration unit of claim 1, wherein the corner key includes a reservoir configured to collect fluid, and wherein the fluid path is defined from the reservoir, through the corner key fluid outlet, and through the aperture to drain from the fenestration unit.

6. The fenestration unit of claim 1, wherein the cladding includes an apron segment with the aperture, the aperture being open at one end of the apron segment.

7. The fenestration unit of claim 1, wherein the cladding includes an apron segment that defines at least part of the aperture and that includes a weep outlet; and wherein the fluid path is defined from the frame corner key, through the corner key fluid outlet, through the aperture, and through the weep outlet to drain from the fenestration unit.

8. The fenestration unit of claim 7, further comprising a frame sill member;

wherein the apron segment includes a cover portion that at least partly covers the frame sill member and the frame corner key;

wherein the apron segment includes a first projecting wall and a second projecting wall that project from the cover portion; and wherein the aperture is included in the cover portion, and the weep outlet is defined between the first and second projecting walls.

9. A fenestration unit comprising:

a frame corner key that includes a corner key fluid outlet;

a cladding having an aperture for the corner key fluid outlet;

a weep drainage system with a fluid path defined from the frame corner key, through the corner key fluid outlet, and through the aperture to drain from the fenestration unit;

a sealing member that seals between the frame corner key and the cladding, proximate the aperture;

the frame corner key including a projection and the aperture receiving the projection, the corner key fluid outlet extending along the projection;

the sealing member extending within a gap between the projection and the cladding, proximate the aperture; and the corner key including a sealant injection aperture that provides fluid access to the gap from outside the fenestration unit.

10. The fenestration unit of claim 9, wherein the corner key includes a reservoir configured to collect fluid, and wherein the fluid path is defined from the reservoir, through the corner key fluid outlet, and through the aperture to drain from the fenestration unit.

11. The fenestration unit of claim 9, wherein the cladding includes an apron segment with the aperture, the aperture being open at one end of the apron cladding segment.

12. The fenestration unit of claim 9, wherein the cladding includes an apron segment that defines at least part of the aperture and that includes a weep outlet; and wherein the fluid path is defined from the frame corner key, through the corner key fluid outlet, through the aperture, and through the weep outlet to drain from the fenestration unit.

13. The fenestration unit of claim 12, further comprising a frame sill member;

wherein the apron segment includes a cover portion that at least partly covers the frame sill member and the frame corner key;

wherein the apron segment includes a first projecting wall and a second projecting wall that project from the cover portion; and wherein the aperture is included in the cover portion, and the weep outlet is defined between the first and second projecting walls.

14. A fenestration unit comprising:

a frame corner key that includes a corner key fluid outlet;

a cladding having an aperture for the corner key fluid outlet, the cladding including an apron segment that defines at least part of the aperture and that includes a weep outlet;

a frame sill member, the apron segment including a cover portion that at least partly covers the frame sill member and the frame corner key, the apron segment including a first projecting wall and a second projecting wall that project from the cover portion;

a weep drainage system with a fluid path defined from the frame corner key, through the corner key fluid outlet, and through the aperture to drain from the fenestration unit, the fluid path being defined from the frame corner key, through the corner key fluid outlet, through the aperture, and through the weep outlet to drain from the fenestration unit; and the aperture being included in the cover portion, and the weep outlet being defined between the first and second projecting walls.

15. The fenestration unit of claim 14, wherein the frame corner key includes a projection, and the aperture receives the projection, the corner key fluid outlet extending along the projection.

16. The fenestration unit of claim 14, further comprising a sealing member that seals between the frame corner key and the cladding, proximate the aperture.

17. The fenestration unit of claim 16, wherein the frame corner key includes a projection and the aperture receives the projection, the corner key fluid outlet extending along the projection; and wherein the sealing member extends within a gap between the projection and the cladding, proximate the aperture.

18. The fenestration unit of claim 14, wherein the corner key includes a reservoir configured to collect fluid, and wherein the fluid path is defined from the reservoir, through the corner key fluid outlet, and through the aperture to drain from the fenestration unit.

19. The fenestration unit of claim 14, wherein the aperture is open at one end of the apron segment.

* * * * *